US006982069B2

(12) United States Patent
Tanaka et al.

(10) Patent No.: US 6,982,069 B2
(45) Date of Patent: Jan. 3, 2006

(54) DYE FIXING AGENT FOR WATER-COLOR INK, INK JET RECORDING MEDIUM AND POROUS HYDROTALCITE COMPOUND

(75) Inventors: Kanako Tanaka, Kagawa (JP); Akira Okada, Kagawa (JP)

(73) Assignee: Kyowa Chemical Industry Co., Ltd., Kagawa (JP)

( * ) Notice: Subject to any disclaimer, the term of this patent is extended or adjusted under 35 U.S.C. 154(b) by 0 days.

(21) Appl. No.: 10/608,262

(22) Filed: Jun. 30, 2003

(65) Prior Publication Data

US 2004/0091683 A1 May 13, 2004

Related U.S. Application Data

(62) Division of application No. 09/857,868, filed as application No. PCT/JP00/07190 on Oct. 17, 2000, now abandoned.

(30) Foreign Application Priority Data

| | | |
|---|---|---|
| Oct. 18, 1999 | (JP) | 11-295751 |
| Oct. 21, 1999 | (JP) | 11-299735 |
| Nov. 16, 1999 | (JP) | 11-326001 |
| Apr. 24, 2000 | (JP) | 2000-122005 |
| Apr. 24, 2000 | (JP) | 2000-122006 |

(51) Int. Cl.
*C01B 33/24* (2006.01)

(52) U.S. Cl. .......... 423/327.1

(58) Field of Classification Search .......... 423/327.1, 423/331, 420.2

See application file for complete search history.

(56) References Cited

U.S. PATENT DOCUMENTS

| | | | | |
|---|---|---|---|---|
| 4,351,814 | A * | 9/1982 | Miyata et al. | 423/331 |
| 5,861,133 | A * | 1/1999 | Okada et al. | 423/420.2 |
| 6,306,494 | B1 * | 10/2001 | Takahashi et al. | 423/420.2 |
| 6,418,661 | B1 * | 7/2002 | Takahashi et al. | 423/327.1 |

FOREIGN PATENT DOCUMENTS

| | | |
|---|---|---|
| JP | A 10273324 | 10/1998 |
| JP | 2000211917 | 8/2000 |
| WO | WO00/32515 | 6/2000 |

* cited by examiner

*Primary Examiner*—Stuart Hendrickson
(74) *Attorney, Agent, or Firm*—Sherman & Shalloway

(57) ABSTRACT

A dye fixing agent for water-color ink to be contained in the water-color ink accepting layer of an ink jet recording medium having an water-color ink accepting layer formed on a substrate, which is a hydrotalcite compound containing a silicic acid anion and a sulfuric acid ion, or a silicic acid anion as an anion(s).

An ink jet recording medium comprising the dye fixing agent for water-color ink formed on a substrate.

The dye fixing agent for water-color ink of the present invention is excellent in the fixability of water-color ink, the resolution of an image recorded on a medium, water resistance and light resistance.

10 Claims, 1 Drawing Sheet

Ex.: Example
C.Ex.: Comparative Example

DYE FIXING AGENT FOR WATER-COLOR INK, INK JET RECORDING MEDIUM AND POROUS HYDROTALCITE COMPOUND

CROSS REFERENCE TO RELATED APPLICATION

This application is a divisional of application Ser. No. 09/857,868, filed on Jun. 12, 2001, now abandoned which is a U.S. nationalization of International Application PCT/JP00/07190, filed Oct. 17, 2000, which claims priority from Japanese Patent Applications 11-295751, filed Oct. 18, 1999, 11-299735, filed Oct. 21, 1999, 11-326001, filed Nov. 16, 1999, 2000-122005, filed Apr. 24, 2000, and 2000-122006, filed Apr. 24, 2000.

DETAILED DESCRIPTION OF THE INVENTION

1. Field of the Invention

The present invention relates to a water-soluble dye fixing agent which can be used in an ink jet recording medium to form a recorded image using water-color ink containing a water-soluble dye and to an ink jet recording medium comprising the same. Particularly, it relates to a dye fixing agent for ink jet recording media which is excellent in the fixability of water-color ink and the resolution, water resistance and light resistance of an image recorded on an medium and to an ink jet recording medium comprising the same. The present invention also relates to a novel porous hydrotalcite compound.

2. Prior Art

Along with progress made in personal computers and digital cameras, displayed images have been recorded on printing paper like silver salt-based photographs. An image forming system called "ink jet recording system" is known as a system for recording such displayed images. Since this ink jet recording system has various features such as little noise, high-speed recording, multi-color recording, wide applicability of a recorded pattern and the elimination of need for development and fixing, it is used in many fields.

The principle of the ink jet recording system is that an ink solution is ejected from a nozzle by a drive source such as electric field, heat or pressure and transferred to the accepting layer of printing paper. The ink solution comprises a dye, water, polyhydric alcohol and the like and a water-soluble substantive dye or acidic dye is used mainly as the dye.

The printing paper is constructed by forming a dye accepting layer on a substrate and coated paper, glossy paper, glossy film, OHP film or the like is used as the substrate according to need. The accepting layer comprises a water-soluble polymer having excellent affinity for a dye, organic or inorganic filler and other auxiliary substances whose blending ratio is suitably adjusted to control the permeability of the dye and to suppress a blurred image.

Images obtained by this ink jet recording system now have high definition thanks to recent marked progress made in the quality of the images and the improvement of dot density and the glossiness of the accepting layer, so as to have as high quality as that of a silver-base photograph at a visible range.

JP-A 61-135785 (the term "JP-A" as used herein means an "unexamined published Japanese patent application") (JP-B 4-15747) (the term "JP-B" as used herein means an "examined Japanese patent publication") proposes that the light resistance of a substrate is improved by using synthetic silica and a hydrotalcite consisting of a carbonic acid ion as a divalent anion in a dye accepting layer.

PROBLEMS TO BE SOLVED BY THE INVENTION

The substantive dye or acidic dye contained in the ink solution used in the ink jet system is retained in the accepting layer by interaction such as van der Waals binding force and hydrogen bond with the constituent components of the accepting layer after it has been transferred to the accepting layer as shown by the dyeing theory of dyes. Therefore, when an image formed on the accepting layer is contacted to a solvent or resin having high affinity for the dye or when heat energy large enough to cancel the interaction is supplied, the elution or transfer of the dye is induced, thereby causing such inconvenience as a blurred image. That is, the dye transferred to the accepting layer does not show completely stable fixability like a silver salt-based photograph. The same is said of stationery using a substantive dye or acidic dye and general image forming materials used for printing and the like.

MEANS FOR SOLVING THE PROBLEMS

To cope with this, the inventors of the present invention have conducted studies to develop a fixing agent capable of stably fixing a dye in the water-color ink accepting layer of an ink jet recording medium having a water-color ink accepting layer formed on a substrate. That is, the inventors have conducted studies to develop a fixing agent which prevents the elution or transfer of a dye even when it is contacted to a solvent or a resin having high affinity for the dye or when heat is supplied to the dye after the dye is transferred to the accepting layer and fixed.

The inventors have paid attention to a hydrotalcite compound as a fixing agent, synthesized various hydrotalcite compounds and investigated the dye fixing stabilities of the compounds.

As a result, they have found that the type of an anion(s) forming a hydrotalcite compound is closely related to dye fixing stability and that a hydrotalcite compound having both a silicic acid anion and a sulfuric acid ion, or a silicic acid anion as an anion(s) has extremely stable fixability for a dye. It has also been found that when this hydrotalcite compound is used as a fixing agent, a high-definition image recording medium can be obtained. The hydrotalcite compound containing a silicic acid anion and a sulfuric acid ion, or a silicic acid anion as an anion(s) in a certain amount and having specific pore characteristics has more stable fixability.

According to the present invention, there is provided a dye fixing agent for water-color ink to be contained in the water-color ink accepting layer of an ink jet recording medium having a water-color ink accepting layer formed on a substrate, which is a hydrotalcite compound containing a silicic acid anion and a sulfuric acid ion, or a silicic acid anion as an anion(s).

According to the present invention, there is further provided an ink jet recording medium which comprises a hydrotalcite compound containing the above specific anion(s) as a dye fixing agent.

The dye fixing agent for water-color ink and the ink jet recording medium comprising the same of the present invention will be described in detail hereinbelow.

The hydrotalcite compound used as the dye fixing agent for water-color ink of the present invention is characterized in that it contains a silicic acid anion and a sulfuric acid ion, or a silicic acid anion as an anion(s) forming the compound. More specifically, the hydrotalcite compound is more advantageously a hydrotalcite compound which contains a silicic acid anion and a sulfuric acid ion, or a silicic acid anion in an amount of 10 to 98 mol %, preferably 20 to 98 mol % based on the total of all the anions.

The silicic acid anion is $SiO_3^{2-}$, $HSiO_3^-$, $Si_2O_5^{2-}$ or $HSi_2O_5^-$ and the sulfuric acid ion is $SO_4^{2-}$.

When the hydrotalcite compound used in the present invention contains a silicic acid anion and a sulfuric acid ion as anions, it contains the silicic acid anion in an amount of 5 to 100 mol %, preferably 10 to 100 mol %, particularly preferably 20 to 100 mol % based on the total of the silicic acid anion and the sulfuric acid ion.

It is advantageous that the hydrotalcite compound used in the present invention should have an average particle diameter measured by a laser diffraction scattering method of 0.1 to 10 $\mu$m, preferably 0.5 to 10 $\mu$m.

The hydrotalcite compound used in the present invention is preferably a compound represented by the following formula (I).

$$M^{II}_{1-x}Al_x(OH)_2(A_1^{n-})_a(A_2^{m-})_b.yH_2O \quad (I)$$

wherein $M^{II}$ is $Mg^{2+}$ or/and $Zn^{2+}$, $A_1^{n-}$ is a silicic acid anion having a valence of n and a sulfuric acid ion ($SO_4^{2-}$), or a silicic acid anion having a valence of n, with the proviso that the silicic acid anion having a valence of n is an anion selected from the group consisting of $SiO_3^{2-}$, $HSiO_3^-$, $Si_2O_5^{2-}$ and $HSi_2O_5^-$, $A_2^{m-}$ is an anion selected from the group consisting of $CO_3^{2-}$, $NO_3^-$, $Cl^-$ and $OH^-$, x and y satisfy $0.15<x\leqq 0.80$ and $0<y<2$, and a and b satisfy $0.15<na+mb\leqq 0.80$.

In the above formula (I), $M^{II}$ is Mg or/and Zn but it is preferably Mg alone or a mixture of $Mg^{2+}$ and $Zn^{2+}$ (solid solution). When $M^{II}$ is a mixture of Mg and Zn, the amount of Zn is preferably equivalent to or less than Mg.

As described above, the hydrotalcite compound used in the present invention is characterized in that it contains a specific anion(s) in a specific proportion to the total of all the anions. In the above formula (I), all the anions are represented by $(A_1^{n-}+A_2^{m-})$ and the hydrotalcite compound of the above formula (I) in which the proportion $(A_1^{n-}/(A_1^{n-}+A_2^{m-}))$ of the silicic acid anion and the sulfuric acid ion, or the silicic acid anion, represented by $A_1^{n-}$ to the total of all the anions is 10 to 98 mol %, preferably 20 to 98 mol % is used. Since it is difficult to obtain a hydrotalcite compound of the above formula (I) in which all the anions are $A_1^{n-}$, the upper limit of the proportion of $A_1^{n-}$ to the total of all the anions is 98 mol %. When the proportion of $A_1^{n-}$ is smaller than 10 mol %, a fixing agent having low dye fixing stability is obtained disadvantageously.

The hydrotalcite compound represented by the above formula (I) includes hydrotalcite compounds represented by the following formulas (I-a) and (I-b) based on X and the total amount of all the anions in the formula.

$$M^{II}_{1-x}Al_x(OH)_2(A_1^{n-})_a(A_2^{m-})_b.yH_2O \quad (I\text{-}a)$$

wherein $M^{II}$ is $Mg^{2+}$ or/and $Zn^{2+}$, $A_1^{n-}$ is a silicic acid anion having a valence of n and a sulfuric acid ion ($SO_4^{2-}$), or a silicic acid anion having a valence of n, with the proviso that the silicic acid anion having a valence of n is an anion selected from the group consisting of $SiO_3^{2-}$, $HSiO_3^-$, $Si_2O_5^{2-}$ and $HSi_2O_5^-$, $A_2^{m-}$ is an anion selected from the group consisting of $CO_3^{2-}$, $NO_3^-$, $Cl^-$ and $OH^-$, x and y satisfy $0.50<x\leqq 0.80$ and $0<y<2$, and a and b satisfy $0.50<na+mb\leqq 0.80$.

$$M^{II}_{1-x}Al_x(OH)_2(A_1^{n-})_a(A_2^{m-})_b.yH_2O \quad (I\text{-}b)$$

wherein $M^{II}$ is $Mg^{2+}$ or/and $Zn^{2+}$, $A_1^{n-}$ is a silicic acid anion having a valence of n and a sulfuric acid ion ($SO_4^{2-}$), or a silicic acid anion having a valence of n, with the proviso that the silicic acid anion having a valence of n is an anion selected from the group consisting of $SiO_3^{2-}$, $HSiO_3^-$, $Si_2O_5^{2-}$ and $HSi_2O_5^-$, $A_2^{m-}$ is an anion selected from the group consisting of $CO_3^{2-}$, $NO_3^-$, $Cl^-$ and $OH^-$, x and y satisfy $0.15<x\leqq 0.50$ and $0<y<2$, and a and b satisfy $0.15<na+mb\leqq 0.50$.

It has been discovered that the hydrotalcite compound represented by the above formula (I-a) is a novel compound and is superior in dye fixing stability to the hydrotalcite compound of the above formula (I-b) and other hydrotalcite compounds and can provide a recording medium which gives a high-definition image.

The hydrotalcite compound represented by the above formula (I-a) has a large surface area of each particle and excellent pore characteristics. It is considered that a dye is easily fixed and the fixed dye can be stably existent because the hydrotalcite compound has a large pore volume and a small average pore radius in particular.

That is, the hydrotalcite compound represented by the above formula (I-a) has the following characteristic properties (1) to (3):

(1) Its specific surface area measured by a BET method is 50 to 400 $m^2/g$, preferably 100 to 300 $m^2/g$.

(2) Its total pore volume measured by an $N_2$ gas adsorption method is 0.50 to 2.00 ml/g, preferably 0.7 to 1.6 ml/g.

(3) Its average pore radius measured by the $N_2$ gas adsorption method is 4 to 15 nm, preferably 7 to 10 nm.

The hydrotalcite compound of the formula (I-a) has an average particle diameter measured by the laser diffraction scattering method of 0.1 to 10 $\mu$m, preferably 0.5 to 10 $\mu$m and a unit layer interval of 8 to 12 Å.

A hydrotalcite compound containing a silicic acid anion and a sulfuric acid ion, or a silicic acid anion as an anion(s) is used as the dye fixing agent of the preset invention. This hydrotalcite compound is preferably a compound represented by the above formula (I), the most preferably a compound represented by the above formula (I-a).

The hydrotalcite compound represented by the above formula (I-a) is a novel compound and has been unknown. Since the hydrotalcite compound represented by the above formula (I-a) is more porous and more excellent in pore characteristics, it has extremely excellent characteristic properties as a dye fixing agent in addition to the characteristic properties of anions.

Accordingly, the hydrotalcite compound containing a silicic acid anion and a sulfuric acid ion, or a silicic acid anion as a dye absorbent in the present invention has all the above advantages, thereby making it possible to retain dye molecules between layers, thereby stabilizing the dye molecules, and to obtain an image having excellent ink absorptivity, resolution, water resistance and light resistance.

In the ink jet recording medium of the present invention, coating solution constituting substances other than the dye fixing agent for water-color ink will be described hereinbelow. To form a dye accepting layer on the substrate, a coating solution containing the dye fixing agent of the present invention is used. The coating solution comprises a polymer adhesive, additives and a solvent which are known per se as the main ingredients in addition to the dye fixing agent. It may further contain an inorganic or organic pigment as required. The ink jet recording medium of the present invention may consist of a single layer or multiple layers and the substrate of the ink jet recording medium may be subjected to a corona treatment or anchor coat treatment to improve adhesion. The accepting layer may be a single layer or multi-layer as required.

An inorganic or organic pigment may be used as an auxiliary in the accepting layer as required. Examples of the pigment include inorganic pigments such as synthetic silica, colloidal silica, cationic colloidal silica, alumina sol, pseudo-boehmite gel, talc, kaolin, clay, baked clay, zinc oxide, zinc sulfide, zinc carbonate, tin oxide, aluminum oxide, aluminum hydroxide, aluminum silicate, calcium carbonate, calcium sulfate, calcium silicate, satin white, barium sulfate, titanium dioxide, magnesium silicate, magnesium carbonate, magnesium oxide, smectite, lithopone, mica, zeolite and diatomaceous earth; and organic pigments such as styrene-based plastic pigments, acrylic plastic pigments, microcapsuled plastic pigments, urea resin-based plastic pigments, melamine resin-based plastic pigments, benzoguanamine-based plastic pigments and acryl nitrile-based plastic pigments all of which are known per se in the field of general coated paper. A suitable pigment may be selected appropriately from these and used.

Examples of the polymer adhesive include (a) starches such as starch, oxidized starch, etherified starch and cationized starch; (b) cellulose derivatives such as methyl cellulose, carboxymethyl cellulose, hydroxyethyl cellulose, hydroxypropyl cellulose and hydroxypropylmethyl cellulose; (c) proteins such as gelatin, casein, soybean protein and synthetic protein; (d) natural and semi-synthetic adhesives such as agarose, guar gum, chitosan and soda alginate; (e) polyvinyl alcohol derivatives such as polyvinyl alcohol, cationic polyvinyl alcohol and silicon-containing polyvinyl alcohol; (f) synthetic, water-soluble and solvent-soluble adhesives such as polyethyleneimine-based resins, polyvinylpyrrolidone-based resins, poly(meth)acrylic acid and copolymers thereof, maleic anhydride-based resins, acrylamide-based resins, (meth)acrylate-based resins, polyamide-based resins, polyurethane-based resins, polyester-based resins, polyvinyl butyral-based resins, alkyd resins, epoxy-based resins, epichlorohydrin-based resins, urea resins and melamine resins; (g) conjugated diene-based latices such as styrene-butadiene copolymer and methyl methacrylate-butadiene copolymer, acrylic polymer latices such as acrylate and methacrylate polymers and copolymers, vinyl-based polymer latices such as ethylene-vinyl acetate copolymer, and modified polymer latices containing a functional group such as anionic group or/and cationic group thereof; and (h) conductive resins typified by polyvinylbenzyltrimethylammonium chloride, polydiallyldimethylammonium chloride, polymethacryloyloxyethyl-β-hydroxyethyldimethylammonium chloride and polydimethylaminoethyl methacrylate hydrochloric acid salts. These polymer adhesives known in this technical field are used alone or in combination.

Various additives may be added in limits that do not prevent fixability. The additives include conventionally known additives which are commonly used, such as a dispersant, anti-foaming agent, thickener, ultraviolet light absorbent, fluorescent whitening agent, antioxidant, water resisting agent, surfactant, fluidity modifier, heat stabilizer, foam-inhibitor, foaming agent, tackifier, pH control agent, penetrant, wetting agent, heat gelling agent, lubricant, coloring agent, antiseptic, mildew-proofing agent, antistatic agent and crosslinking agent.

Preferred examples of the solvent of the coating solution include lower alcohols such as methyl alcohol, ethyl alcohol and propyl alcohol; glycols such as ethylene glycol, diethylene glycol, triethylene glycol and dioxane; lower alkyl esters such as methyl acetate and ethyl acetate; water-soluble organic solvents such as acetonitrile and dimethyl acetamide; and water. These solvents may be used alone or in admixture of two or more.

Woodfree paper, medium-grade woodfree paper, coated paper, art paper, cast coated paper, paper board, synthetic resin laminated paper, metal deposited paper, synthetic paper, white film or the like is used as the substrate of a recording medium which does not need to transmit light whereas glass or a film of polyethylene terephthalate, polyester, polystyrene, polyvinyl chloride, polymethyl methacrylate, polycarbonate, polyimide, cellulose triacetate, cellulose diacetate, polyethylene or polypropylene, such as an OHP sheet is used as the substrate of a light transmitting recording medium. The amount of the dye fixing agent is 10 to 90 wt %, preferably 15 to 90 wt % based on the total of solids (dye fixing agent, polymer adhesive, solid additives, pigment, etc.) constituting the accepting layer. When the amount of the dye fixing agent is too large, the accepting layer lacks flexibility and when the amount is too small, the accepting layer becomes inferior in dye fixability.

The method and means of forming a water-color ink accepting layer are not particularly limited and a suitable method may be employed according to the material of the substrate. The most common substrate coating method uses a bar coater, roll coater, air knife coater, blade coater, rod blade coater, brush coater, curtain coater, gravure coater, flexographic coater, cast coater, die coater, lip coater, size press or spray.

In addition to the above method in which a recording medium is obtained by forming a dye accepting layer on the substrate, there is another method in which a dye fixing agent is retained in entangled fibers and between them in the case of a recording medium comprising a dye accepting layer and a substrate both of which are integrated with each other, for example, pulp such as paper. An excellent recorded image forming material can be obtained by containing the dye fixing agent of the present invention in a substrate itself including a surface thereof.

A coating solution is prepared by using the above dye fixing agent, polymer adhesive, additives, pigment and solvent.

EXAMPLES

Figure 1:
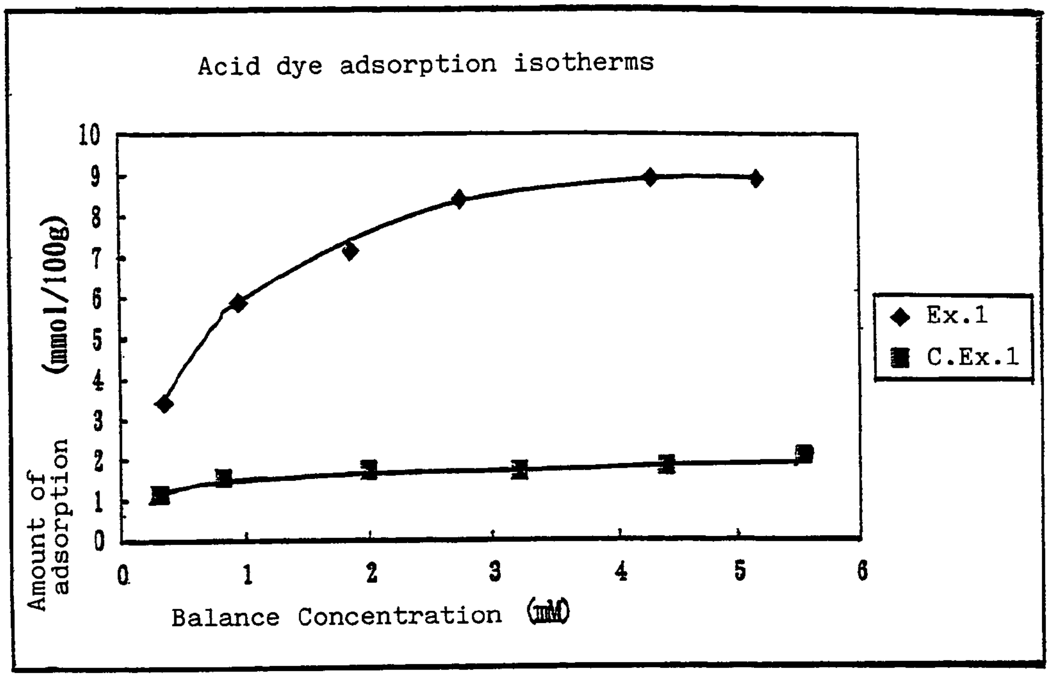
FIG. 1 is a diagram showing the acid dye adsorption isotherms of hydrotalcite compounds obtained in Example 1 and Comparative Example 1 in the present invention.

The following examples are given to further illustrate the present invention.

In the examples, the measurement and evaluation of physical properties were carried out as follows.

(1) The BET specific surface area ($m^2$/g), total pore volume (ml/g) and average pore radius (nm) of a hydrotalcite compound (particles) were obtained from $N_2$ gas adsorption and desorption curves using the BELSORP 28SA gas adsorption apparatus of Nippon Bell Co., Ltd. after a measurement sample was maintained at 110° C. and $2.7\times10^{-1}$ Pa or less for 3 hours as a pre-treatment. The total pore volume is the total volume of pores having a radius of 1 to 100 nm.

(2) The average particle diameter ($\mu$m) of a hydrotalcite compound (particles) was measured by the LA-910 laser diffraction/scattering system particle size distribution measuring instrument of HORIBA Co., Ltd.

(3) The unit layer interval (dÅ) of a hydrotalcite compound (particles) was measured by the RINT 2200V X-ray diffraction apparatus of Rigaku Co., Ltd.

Example 1

19.94 g of magnesium oxide (commercially available product, content of 97%, BET specific surface area of 6.8 $m^2/g$) and 0.5 liter of deionized water were placed in a 1-liter vessel and 0.125 liter of an aqueous solution of aluminum sulfate having a concentration of 1.04 mol/l was added at room temperature under strong agitation by a homomixer. After about 30 minutes of agitation, the resulting suspension was heated to carry out a reaction at 70° C. for 6 hours. After cooling [pH of the suspension was 7.15 (29.3° C.)], the suspension was filtered and washed. Thereafter, 1 liter of deionized water and the washed product were placed in a 2-liter vessel, fully dispersed and suspended by a homomixer and heated at 70° C. A No. 3 water glass solution (0.104 mol of $SiO_2$) was added to carry out an ion exchange reaction at 70° C. for 2 hours. After cooling, the reaction product was filtered, washed and dried at 95° C. for 20 hours. The yield of the dried product was 37.4 g. After drying, the dried product was put through a 100-mesh sieve. The porous hydrotalcite compound (sample H.T.-a-1) obtained by the above method was represented by the following chemical formula 1. The physical properties of this hydrotalcite compound are shown in Table 1 below.

$$Mg_{0.353}Al_{0.647}(OH)_2(HSi_2O_5)_{0.136}(SO_4)_{0.045}(OH)_{0.421}\cdot 0.356H_2O \quad \text{(chemical formula 1)}$$

$$Mg_{1.09}Al_2(OH)_{6.18}(HSi_2O_5)_{0.42}(SO_4)_{0.14}(OH)_{1.39}\cdot 1.10H_2O \quad \text{(composition formula 1)}$$

Example 2

28.4 g of magnesium hydroxide (commercially available product, content of 98.5%, BET specific surface area of 30 $m^2/g$) and 0.5 liter of deionized water were placed in a 1-liter vessel and 0.107 liter of an aqueous solution of aluminum sulfate having a concentration of 1.04 mol/l was added at room temperature under strong agitation by a homomixer. After about 30 minutes of agitation, the resulting suspension was heated to carry out a reaction at 90° C. for 4 hours. After cooling [pH of the suspension was 7.05 (30.3° C.)], the suspension was filtered and washed. Thereafter, 1 liter of deionized water and the washed product were placed in a 2-liter vessel, fully dispersed and suspended by a homomixer and heated at 80° C. A No. 3 water glass solution (0.112 mol of $SiO_2$) was added to carry out an ion exchange reaction at 80° C. for 2 hours. After cooling, the reaction product was filtered, washed and dried at 95° C. for 20 hours. The yield of the dried product was 39.3 g. After drying, the dried product was put through a 100-mesh sieve. The porous hydrotalcite compound (sample H.T.-a-2) obtained by the above method was represented by the following chemical formula 2. The physical properties of this hydrotalcite compound are shown in Table 1 below.

$$Mg_{0.486}Al_{0.514}(OH)_2(HSi_2O_5)_{0.131}(SO_4)_{0.071}(CO_3)_{0.004}(OH)_{0.232}\cdot 0.445H_2O \quad \text{(chemical formula 2)}$$

$$Mg_{1.89}Al_2(OH)_{7.78}(HSi_2O_5)_{0.51}(SO_4)_{0.28}(CO_3)_{0.015}(OH)_{0.91}\cdot 1.73H_2O \quad \text{(composition formula 2)}$$

Example 3

18.86 g of magnesium oxide (content of 97%, BET specific surface area of 6.8 $m^2/g$) and 2.12 g of zinc oxide (commercially available product, BET specific surface area of 3.5 $m^2/g$) were suspended in deionized water and the total amount was adjusted to 0.5 liter. This suspension was placed in a 1-liter vessel and 0.125 liter of an aqueous solution of aluminum sulfate having a concentration of 1.04 mol/l was added at room temperature under strong agitation by a homomixer. After about 30 minutes of agitation, the suspension was heated to carry out a reaction at 90° C. for 4 hours. After cooling [pH of the suspension was 7.21 (21.9° C.)], the suspension was filtered and washed. Thereafter, 1 liter of deionized water and the washed product were placed in a 2-liter vessel, fully dispersed and suspended by a homomixer and heated at 80° C. A No. 3 water glass solution (0.104 mol of $SiO_2$) was added to carry out an ion exchange reaction at 80° C. for 2 hours. After cooling, the reaction product was filtered, washed, dried at 95° C. for 20 hours and put through a 100-mesh sieve to obtain a porous hydrotalcite compound (sample H.T.-a-3) represented by the following chemical formula 3. The physical properties of this hydrotalcite compound are shown in Table 1 below.

$$Mg_{0.295}Zn_{0.064}Al_{0.641}(OH)_2(HSi_2O_5)_{0.131}(SO_4)_{0.051}(OH)_{0.407}\cdot 0.32H_2O \quad \text{(chemical formula 3)}$$

$$Mg_{0.92}Zn_{0.20}Al_2(OH)_{6.24}(HSi_2O_5)_{0.41}(SO_4)_{0.16}(OH)_{1.27}\cdot H_2O \quad \text{(composition formula 3)}$$

Comparative Example 1

A hydrotalcite compound comprising an interlayer anion which was substantially $CO_3^{2-}$ (manufactured by Kyowa Kagaku Kogyo Co., Ltd., trade name of DHT4) was represented by the chemical formula 4. This sample was designated as H.T-b-1. The physical properties of this hydrotalcite compound are shown in Table 1 below.

$$Mg_{0.682}Al_{0.318}(OH)_2(CO_3)_{0.158}(SO_4)_{0.00143}\cdot 0.557H_2O \quad \text{(chemical formula 4)}$$

$$Mg_{4.28}Al_2(OH)_{12.56}(CO_3)_{0.99}(SO_4)_{0.009}\cdot 3.5H_2O \quad \text{(composition formula 4)}$$

Comparative Example 2

The physical properties of commercially available synthetic silica (trade name of Fine Seal, manufactured by Tokuyama Corporation) are shown in Table 1 below. This sample was designated as S.I.

TABLE 1

| | name of sample | average particle diameter ($\mu$m) | BET ($m^2/g$) | total pore volume (ml/g) | average pore radius (nm) | unit layer interval dÅ | bulk 1) (loose/pat) |
|---|---|---|---|---|---|---|---|
| Ex.1 | H.T. -a-1 | 5.06 | 264 | 1.34 | 7.7 | 11.305 | 128/86 |
| Ex.2 | H.T. -a-2 | 5.99 | 175 | 0.87 | 7.3 | 11.135 | 90/76 |
| Ex.3 | H.T. -a-3 | 5.90 | 214 | 1.20 | 8.0 | 11.079 | 116/100 |

TABLE 1-continued

| | name of sample | average particle diameter (μm) | BET ($m^2$/g) | total pore volume (ml/g) | average pore radius (nm) | unit layer interval dÅ | bulk 1) (loose/pat) |
|---|---|---|---|---|---|---|---|
| C.Ex.1 | H.T. -b-1 | 0.67 | 13.1 | 0.05 | 8.7 | 7.642 | 45/36 |
| C.Ex.2 | S.I. | 10.1 | 292 | 3.7 | 10 | — | 102/91 |

Ex.: Example
C.Ex.: Comparative Example
1) measurement of bulk; 10 or 5 g of a sample is placed in a 100 ml messcylinder to measure loose bulk (ml/10 g). Pat bulk (ml/10 g) is a value after 30 times of patting.

It is understood from Table 1 above that the porous hydrotalcite compounds represented by the formula (I-a) of the present invention (Examples 1 to 3) have a larger BET specific surface area and more excellent pore characteristics with a large pore volume than the hydrotalcite compounds of Comparative Examples because they contain a silicic acid anion and a sulfuric acid ion, or a silicic acid anion in a part of exchangeable anions.

Example 4

(Adsorption Test of Acidic Dye)

0.5 g of an adsorbent and 20 ml of a dye solution of Naphthol Yellow S whose concentration has been adjusted were placed in a 100 ml Erlenmeyer flask with stopper a common stopper and shaken until equilibrium was reached at 30° C. (120 times/min). The resulting solution was filtered and the amount of the residual dye in the filtrate was measured by an absorptiometer to obtain the amount and equilibrium concentration of the adsorbed dye at that time. FIG. 1 shows the acidic dye (Naphthol Yellow S) adsorption isotherms of the hydrotalcite compounds of Example 1 and Comparative Example 1 as an adsorbent.

It can be understood from FIG. 1 that the hydrotalcite compound of the present invention is superior in acidic dye adsorptivity to the other hydrotalcite compound (Comparative Example).

Examples 5 to 7 and Comparative Examples 3 to 5

(Evaluation of Ink Jet Recording Medium)

Preparation of Ink Jet Recording Medium:

The hydrotalcite compounds obtained in Examples 1 to 3 and Comparative Example 1 above and synthetic silica (Comparative Example 2) were used to prepare ink jet recording media in accordance with the following method.

40 parts by weight of polyvinyl alcohol as a polymer adhesive, 5 parts by weight of polyethyleneimine which is a cationic resin as an additive and 0.02 part by weight of phosphoric acid as a neutralizer were added to and mixed with 100 parts by weight of the hydrotalcite compound or synthetic silica to obtain a coating solution having a solid content of 18 wt %. This coating solution was applied to paper by a No. 20 bar coater and dried to obtain an ink jet recording medium.

Ink Jet Printing

Cyanogen (C), magenta (M), yellow (Y) and black (B) inks were printed on the obtained ink jet recording medium by an ink jet recording apparatus (trade name of BJ F200 of Canon Inc.).

Evaluation of Printing Properties

The (1) ink absorptivity (color development properties), (2) resolution, (3) water resistance and (4) light resistance of each ink jet recording medium were evaluated as follows.

(1) Ink Absorptivity (Color Development Properties)

A full color image formed on a printing sheet was observed visually. The evaluation of ink absorptivity was carried out based on the following criteria.

5; The image has high density in all the colors and is clear.
4; The image has high density in all the colors.
3; The image has low density in some colors but has no practical problem.
2; The image has low density in some colors.
1; The image has low density in all the colors and is not clear.

(2) Resolution

All the dots were observed through an optical microscope (BHSM-313MU of Olympus Optical Co., Ltd.). The evaluation of resolution was carried out based on the following criteria.

5; All the dots are very sharp.
4; All the dots are sharp.
3; Some dots are not sharp but there is no practical problem.
2; Some dots keep their shape.
1; None of the dots keeps their shape.

(3) Water Resistance

The printed surface was immersed in water for 1 minute and the blot of ink after drying was observed. The evaluation of water resistance was carried out based on the following criteria.

5; The dye of the printed portion does not run or blot on the paper at all.
4; The dye of the printed portion runs slightly but rarely blots.
3; The dye of the printed portion runs slightly and blots slightly but there is no practical problem.
2; The dye of the printed portion runs and blots and the printed characters are hardly identified.
1; The dye of the printed portion runs and blots considerably and the printed characters cannot be identified.

(4) Light Resistance

Solid printing of cyanogen (C), magenta (M), yellow (Y) and black (B) inks was carried out and printed inks were exposed to light until the class 5 blue scale was discolored to a standard level using a Sunshine weather meter (WEL-SUN-HC-B of Suga Shikenki Co., Ltd.) so as to measure and evaluate light resistance using a color difference colorimeter (ZE-2000 of Nippon Denshoku Kogyo Co., Ltd.). The evaluation was made based on a ΔE value.

◎; $0 \leqq \Delta E \leqq 5$
○; $5 < \Delta E \leqq 10$
Δ; $10 < \Delta E \leqq 20$
X; $\Delta E > 20$ Evaluation Results of Printing Properties The evaluation results are shown in Table 2 below. In Comparative Example 5, commercially available ink jet paper (Super Hi-grade KJ-1210 of Kokuyo Co., Ltd.) was used.

TABLE 2

| | | ink | | water | light resistance | | | |
|---|---|---|---|---|---|---|---|---|
| No. | sample name | absorptivity | resolution | resistance | Y | M | C | B |
| Ex.5 | H.T. -a-1 | 5 | 5 | 5 | ◎ | ○ | ○ | ◎ |
| Ex.6 | H.T. -a-2 | 5 | 5 | 5 | ◎ | ○ | ○ | ◎ |
| Ex.7 | H.T. -a-3 | 5 | 5 | 5 | ○ | ○ | ○ | ◎ |
| C.Ex.3 | H.T. -b-1 | 2 | 2 | 3 | ○ | Δ | Δ | Δ |
| C.Ex.4 | S.I. | 3 | 2 | 2 | ○ | X | Δ | ○ |
| C.Ex.5 | — | 5 | 4 | 5 | ○ | X | X | Δ |

Ex.: Example
C.Ex.: Comparative Example

Example 8

0.313 liter of an aqueous solution of magnesium chloride having a concentration of 1.37 mol/l and 0.095 liter of an aqueous solution of aluminum sulfate having a concentration of 1.05 mol/l were mixed together in a 1-liter vessel and 0.380 liter of an aqueous solution of 3 N sodium hydroxide was added at room temperature under agitation by a homomixer. The obtained reaction suspension was transferred to an autoclave to carry out a reaction at 170° C. for 6 hours (pH of the cooled suspension was 9.92 (25.8° C.)). The temperature of the suspension was raised to 80° C. again and a No. 3 water glass solution (0.133 mol of $SiO_2$) was added to carry out an ion exchange reaction at 80° C. for 1 hour. After cooling, the reaction solution was filtered, washed, dried (95° C. for 20 hours) and put through a 100-mesh sieve to obtain a hydrotalcite compound represented by the following chemical formula (5) (sample name of H.T.-a-4). The physical properties of this hydrotalcite compound are shown in Table 3 below.

$$Mg_{0.681}Al_{0.319}(OH)_2(HSi_2O_5)_{0.171}(SO_4)_{0.0512}(CO_3)_{0.0304}\cdot 0.640H_2O \quad \text{(chemical formula 5)}$$

$$Mg_{4.27}Al_2(OH)_{12.45}(HSi_2O_5)_{1.07}(SO_4)_{0.32}(CO_3)_{0.19}\cdot 4H_2O \quad \text{(composition formula 5)}$$

Example 9

Synthesis was carried out in the same manner as in Example 8 before a hydrothermal treatment, a No. 3 water glass solution (0.033 mol of $SiO_2$) was added to carry out an ion exchange reaction at 80° C. for 1 hour, and the reaction product was cooled, filtered, washed, dried (95° C. for 20 hours) and put through a 100-mesh sieve to obtain a hydrotalcite compound represented by the chemical formula 6 (sample name of H.T.-a-5). The physical properties of this hydrotalcite compound are shown in Table 3 below.

$$Mg_{0.685}Al_{0.315}(OH)_2(HSi_2O_5)_{0.0380}(SO_4)_{0.136}(CO_3)_{0.0158}\cdot 0.634H_2O \quad \text{(chemical formula 6)}$$

$$Mg_{4.35}Al_2(OH)_{12.45}(HSi_2O_5)_{0.24}(SO_4)_{0.86}(CO_3)_{0.10}\cdot 4H_2O \quad \text{(composition formula 6)}$$

Example 10

0.7 liter of deionized water was placed in a 1-liter vessel and 20 g of an oxide solid solution obtained by baking synthetic hydrotalcite (manufactured by Kyowa Chemical Industry Co., Ltd., trade name of Kyoward 2200, MgO content of 59.1%, $Al_2O_3$ content of 34.7%) and 8.63 g of synthetic amorphous silica (commercially available Tokuseal U, content of 94.58%) were added and suspended at room temperature under agitation by a stirrer. Thereafter, the resulting suspension was transferred to an autoclave to carry out a reaction at 100° C. for 12 hours. After cooling (pH of the suspension was 10.38 (27.7° C.)), the suspension was filtered, washed, dried (95° C. for 20 hours) and put through a 100-mesh sieve to obtain a hydrotalcite compound represented by the following chemical formula 7 (sample name of H.T.-a-6). The physical properties of this hydrotalcite compound are shown in Table 3 below.

$$Mg_{0.683}Al_{0.317}(OH)_2(HSiO_3)_{0.139}(HSi_2O_5)_{0.0856}(CO_3)_{0.0460}\cdot 0.301H_2O \quad \text{(chemical formula 7)}$$

$$Mg_{4.31}Al_2(OH)_{12.62}(HSiO_3)_{0.88}(HSi_2O_5)_{0.54}(CO_3)_{0.29}\cdot 1.9H_2O \quad \text{(composition formula 7)}$$

Example 11

28.4 g of magnesium hydroxide (content of 98.5%, BET specific surface area of 30 $m^2/g$) and 0.6 liter of deionized water were placed in a 1-liter vessel and 84 ml of an aqueous solution of aluminum sulfate having a concentration of 1.02 mol/l was added at room temperature under strong agitation by a homomixer. After about 30 minutes of agitation, the resulting suspension was heated to carry out a reaction at 90° C. for 4 hours. After cooling (pH of the suspension was 7.22 (30.2° C.)), the reaction solution was filtered and washed. Thereafter, 1 liter of deionized water and the washed product were placed in a 2-liter vessel, fully dispersed and suspended by a homomixer, and heated at 80° C. A No. 3 water glass solution (0.163 mol of $SiO_2$) was added to carry out an ion exchange reaction at 80° C. for 2 hours. After cooling, the reaction product was filtered, washed, dried (95° C. for 20 hours) and put to a 100-mesh sieve to obtain a hydrotalcite compound represented by the following chemical formula 8 (sample name of H.T.-a-7). The physical properties of this hydrotalcite compound are shown in Table 3 below.

$Mg_{0.630}Al_{0.370}(OH)_2(HSi_2O_5)_{0.178}(SO_4)_{0.044}(CO_3)_{0.026}(OH)_{0.052}\cdot 0.556H_2O$ (chemical formula 8)

$Mg_{3.4}Al_2(OH)_{10.8}(HSi_2O_5)_{0.96}(SO_4)_{0.24}(CO_3)_{0.14}(OH)_{0.28}\cdot 3.0H_2O$ (composition formula 8)

Example 12

7.05 g of magnesium oxide (content of 97%, BET specific surface area of 5.2 $m^2/g$) and 18.75 g of zinc oxide (commercially available product, BET specific surface area of 3.5 $m^2/g$) were suspended in deionized water and the total amount was adjusted to 0.5 liter. This suspension was placed in a 1-liter vessel and 0.077 liter of an aqueous solution of aluminum sulfate having a concentration of 1.04 mol/l was added at room temperature under strong agitation by a homomixer. After about 30 minutes of agitation, the suspension was heated to carry out a reaction at 90° C. for 4 hours. After cooling (pH of the suspension was 6.32 (20.4° C.)), the reaction solution was filtered and washed. Thereafter, 1 liter of deionized water and the washed product were placed in a 2-liter vessel, fully dispersed and suspended by a homomixer, and heated at 80° C. A No. 3 water glass solution (0.144 mol of $SiO_2$) was added to carry out an ion exchange reaction at 80° C. for 2 hours. After cooling, the reaction product was filtered, washed, dried (95° C. for 20 hours) and put through a 100-mesh sieve to obtain a hydrotalcite compound represented by the following chemical formula 9 (sample name of H.T.-a-8). The physical properties of this hydrotalcite compound are shown in Table 3 below.

$Zn_{0.577}Mg_{0.01}Al_{0.412}(OH)_2(HSi_2O_5)_{0.185}(SO_4)_{0.054}(CO_3)_{0.003}(OH)_{0.113}\cdot 0.247H_2O$ (chemical formula 9)

$Zn_{2.80}Mg_{0.05}Al_2(OH)_{9.7}(HSi_2O_5)_{0.90}(SO_4)_{0.261}(CO_3)_{0.013}(OH)_{0.552}\cdot 1.2H_2O$ (composition formula 9)

Comparative Example 6

A hydrotalcite compound (sample name of H.T.-b-2) containing an interlayer anion which was substantially $SO_4^{2-}$ was obtained in the same manner as in Example 8 except that the reaction suspension before the ion exchange of a silicic acid anion was dried and reduced in size directly. The chemical formula of the compound is as follows. The physical properties of this hydrotalcite compound are shown in Table 3 below.

$Mg_{0.684}Al_{0.316}(OH)_2(SO_4)_{0.145}(CO_3)_{0.0126}\cdot 0.664H_2O$ (chemical formula 10)

$Mg_{4.33}Al_2(OH)_{12.66}(SO_4)_{0.92}(CO_3)_{0.08}\cdot 4.2H_2O$ (composition formula 10)

Comparative Example 7

80 parts by weight of the hydrotalcite compound represented by the chemical formula 10 obtained in the above Comparative Example 6 and 20 parts by weight of synthetic silica (trade name of Fine Seal, manufactured by Tokuyama Corporation) were mixed together.

TABLE 3

| | name of sample | average particle diameter (μm) | BET ($m^2/g$) | total pore volume (ml/g) | average pore radius (nm) | unit layer interval dÅ | bulk 1) (loose/pat) |
|---|---|---|---|---|---|---|---|
| Ex.8 | H.T. -a-4 | 0.81 | 16.4 | 0.036 | 3.4 | 10.402 | 67/54 |
| Ex.9 | H.T. -a-5 | 0.65 | 19.9 | 0.086 | 7.8 | 8.845 | 118/94 |
| Ex.10 | H.T. -a-6 | 1.20 | 62 | 0.61 | 0.6 | 11.663 | 60/47 |
| Ex.11 | H.T. -a-7 | 6.00 | 173 | 0.71 | 5.9 | 11.135 | 62/55 |
| Ex.12 | H.T. -a-8 | 8.20 | 98 | 0.67 | 9.6 | 10.756 | 43/38 |
| C.Ex.6 | H.T. -b-2 | 2.27 | 14.8 | 0.102 | 12.9 | 8.810 | 27/21 |

Ex.: Example
C.Ex.: Comparative Example
1) measurement of bulk; 10 or 5 g of a sample is placed in a 100 ml mesacylinder to measure loose bulk (ml/10 g). Pat bulk (ml/10 g) is a value after 30 times of patting.

Examples 13 to 17 and Comparative Examples 8 and 9

(Evaluation of Ink Jet Recording Media)

The hydrotalcite compounds obtained in Examples 8 to 12 and Comparative Example 6 above and Sample M.I. X obtained in Comparative Example 7 were used to prepare ink jet recording media in the same manner as the ink jet recording media of Examples 5 to 7. The printing properties of the ink jet recording media were evaluated similarly. The results are shown in Table 4 below.

TABLE 4

| No. | sample name | ink absorptivity | resolution | water resistance | light resistance Y | M | C | B |
|---|---|---|---|---|---|---|---|---|
| Ex.13 | H.T. -a-4 | 4 | 4 | 4 | ◎ | ○ | ○ | ◎ |
| Ex.14 | H.T. -a-5 | 4 | 3 | 4 | ◎ | Δ | ○ | ◎ |
| Ex.15 | H.T. -a-6 | 3 | 4 | 5 | ◎ | Δ | ○ | ○ |
| Ex.16 | H.T. -a-7 | 5 | 4 | 5 | ○ | ○ | ○ | ○ |
| Ex.17 | H.T. -a-8 | 4 | 3 | 4 | ○ | Δ | ○ | ○ |
| C.Ex.8 | H.T. -b-2 | 3 | 2 | 3 | Δ | Δ | Δ | ○ |
| C.Ex.9 | M.I.X. | 2 | 1 | 2 | Δ | Δ | Δ | ○ |

Ex.: Example
C.Ex.: Comparative Example

What is claimed is:

1. A porous hydrotalcite compound represented by the following formula (1):

$$M^{II}_{1-x}Al_x(OH)_2(A_1^{n-})_a(A_2^{m-})_b \cdot yH_2O \quad (1)$$

wherein $M^{II}$ is $Mg^{2+}$ or/and $Zn^{2+}$, $A_1^{n-}$ is a silicic acid ion ($HSi_2O_5^-$) and a sulfuric acid ion ($SO_4^{2-}$), or a silicic acid ion ($HSi_2O_5^-$), $A_2^{m-}$ is an anion selected from the group consisting of $CO_3^{2-}$, $NO_3^-$, $Cl^-$ and $OH^-$, x and y satisfy $0.50<x\leqq 0.80$ and $0<y<2$, and b satisfy $0.50<na+mb\leqq 0.80$, and having a BET specific surface area of 50 to 400 $m^2/g$.

2. The porous hydrotalcite compound according to claim 1, wherein $A_1^{n-}$ is a silicic acid ion ($HSi_2O_5^-$) and a sulfuric acid ion ($SO_6^{2-}$).

3. The porous hydrotalcite compound according to claim 1, wherein the silicic acid ion ($HSi_2O_5^-$) and the sulfuric acid ion ($A_1^{n-}$) accounts for 10 to 98 mol % of the total of all the anions ($A_1^{n-}+A_2^{m-}$).

4. The porous hydrotalcite compound according to claim 1 which has a BET specific surface area of 100 to 300 $m^2/g$.

5. The porous hydrotalcite compound according to claim 1 which has a total pore volume ($N_2$ gas adsorption method) of 0.50 to 2.00 ml/g.

6. The porous hydrotalcite compound according to claim 1 which has an average pore radius ($N_2$ gas adsorption method) of 4 to 15 nm.

7. The porous hydrotalcite compound according to claim 1 which has an average particle diameter of 0.1 to 10 $\mu$m.

8. The porous hydrotalcite compound according to claim 1 which has a total pore volume ($N_2$ gas adsorption method) of 0.70 to 1.60 ml/g.

9. The porous hydrotalcite compound according to claim 1 which has an average pore radius ($N_2$ gas adsorption method) of 7 to 10 nm.

10. The porous hydrotalcite compound according to claim 1 which has an average particle diameter of 0.5 to 10 $\mu$m.

* * * * *